Patented Apr. 9, 1946

2,398,296

UNITED STATES PATENT OFFICE 2,398,296

EMOLLIENT COMPOSITIONS

Albert K. Epstein and Morris Katzman, Chicago, Ill., assignors to The Emulsol Corporation, Chicago, Ill., a corporation of Illinois No Drawing. Application April 1, 1943,
Serial No. 481,466

13 Claims. (Cl. 167—90)

This invention relates to novel and useful compositions for the preparation of emollients such as hand lotions, shaving lotions and the like and to the latter compositions.

It has heretofore been suggested to prepare emollient compositions, in the form of aqueous dispersions or oleaginous-aqueous dispersions and, to this end, it has been proposed to disperse such substances as monoglycerides, for example, monostearin and mono-olein, oleic acid mono-ester of diglycerol, lauryl mono-ether of glycerol, stearic acid mono-esters of glycols and polyglycols, in aqueous or oleaginous-aqueous media, in the preparation of emollient compositions. It has been found, however, that such substances as those mentioned above, by way of illustration, will not disperse in neutral or acid aqueous solutions or aqueous-oleaginous dispersions to produce smooth, homogeneous dispersions which will remain in such condition for appreciable periods of time. For example, attempts to form a 5% dispersion of mono-olein in water have not been successful, a curdy mass separating out after only a short period of time.

In accordance with the present invention, the disadvantages which have characterized former practices are overcome in a highly effective manner. It has been found that when monoglycerides or the like, as set out above and which are referred to in greater detail below, are utilized in conjunction with certain other agents, which shall herein be designated as modifying compounds, it becomes possible to prepare smooth, homogeneous emollient compositions which are stable and which will so remain for very substantial periods of time. Other advantages emanating from the invention will be pointed out hereinafter.

The modifying compounds may, in general, be designated by the formulae

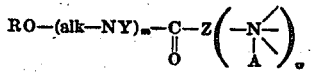

and

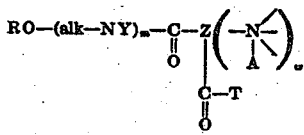

wherein R is an organic radical containing at least four and preferably from six to fourteen carbon atoms, alk stands for hydrocarbon, for example, alkylene or arylene such as ethylene or phenylene, Y is hydrogen, alkyl, cycloalkyl, alkoxyl, aralkyl, aryl, or alkylol, Z is a residue, preferably a carbon-hydrogen residue, of a mono- or poly-carboxylic acid, preferably aliphatic and preferably containing not more than eight carbon atoms, A is an anion, preferably of a solubilizing character and preferably halogen, T is (1) a member of the group NHR' where R' is hydrogen, lower alkyl, hydroxyalkyl, and cycloalkyl, or (2) OY' where Y' is a cation, lower alkyl, cycloalkyl or an aliphatic polyhydric alcohol radical, $m$ and $w$ are whole numbers, $w$ being preferably 1 or 2, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

A particularly satisfactory sub-group of said modifying compounds may be represented by the formula:

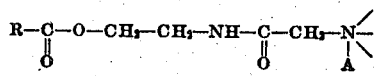

wherein R is a fatty acid hydrocarbon radical containing from five to seventeen and particularly from seven to thirteen carbon atoms, A is halogen, and the three valence bonds attached to nitrogen are linked directly to carbon.

Representative examples of the modifying compounds which are utilized in accordance with the present invention are the following:

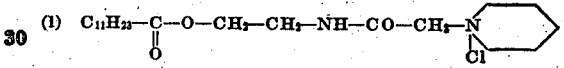

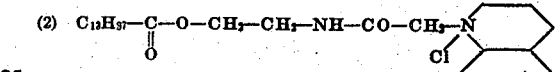

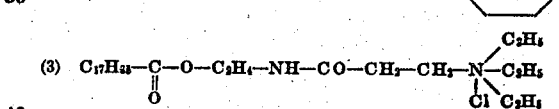

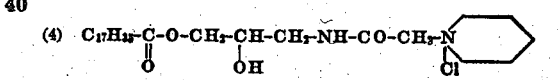

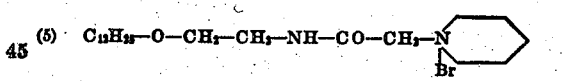

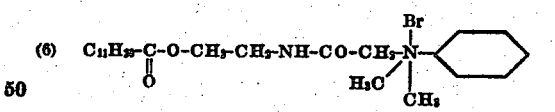

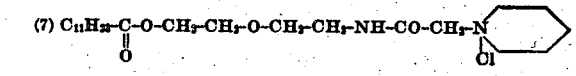

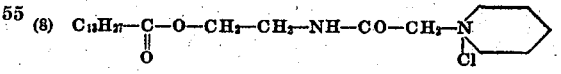

The modifying compounds are disclosed in greater detail in the patent to Albert K. Epstein and Benjamin R. Harris, No. 2,290,173, issued July 21, 1942, and reference may be made thereto. In the said Patent No. 2,290,173, the modifying compounds are shown to possess antiseptic, bactericidal and germicidal properties. In accordance with the present invention, in addition to the primary function served by the modifying compounds, namely, to modify the action of the higher fatty acid monoglyceride and the like so as to permit the production of smooth, homogeneous dispersions, they have the incidental function of imparting some antiseptic, bactericidal and germicidal properties to the compositions in which they are incorporated. No claim is, however, made to such feature in the present invention, such result, as stated above, being incidental to the essential purpose achieved by their use in accordance with the teachings of the present invention.

The esters of the aliphatic polyhydroxy substances which are used in conjunction with the modifying compounds, as described above, comprise the higher molecular weight carboxylic acid partial esters of aliphatic polyhydroxy substances containing at least one free or unesterified hydroxy group attached to the polyhydroxy nucleus. Representative materials in this class are monocaprylin, dicaprylin, monolaurin, dilaurin, monomyristin, monopalmitin, mono-olein, monostearin, oleic acid mono-ester of diglycerol, stearic acid mono-ester of diglycerol; lauric, oleic and stearic acid mono-esters of ethylene glycol, diethylene glycol and triethylene glycol; oleic and stearic acid mono-esters of sorbitol, sorbitan, mannitol and mannitan, and the like.

In general, the partial esters of the aliphatic polyhydroxy substances may be derived by esterification of any of the following illustrative aliphatic polyhydroxy substances with any of the following illustrative higher molecular weight carboxylic acids.

Aliphatic polyhydroxy substances—glycerol; glycols such as ethylene glycol, propylene glycol, trimethylene glycol, butylene glycol and higher homologues or long chain glycols; polyglycols such as diethylene glycol, triethylene glycol, tetraethylene glycol, pentaethylene glycol, hexaethylene glycol, and the higher homologues such as "Carbowax"; pentaerythritol; quercitol; dihydroxy acetone; triethanolamine; tripropanolamine; polyglycerols such as diglycerol, triglycerol, tetraglycerol and the like including mixtures thereof; carbohydrates and sugars including mono-, di- and polysaccharides such as dextrose, sucrose, xylose, arabinose, galactose, fructose, maltose, mannose, dextrin, starch, and the like; the natural and synthetic simple and complex glucosides; sugar alcohols such as arabitol, mannitol, mannitan, mannide, sorbitol, sorbitan, sorbide, and dulcitol; and polyhydroxycarboxylic acid, gluconic acid, glucuronic acid, gulonic acid, mannonic acid, trihydroxyglutaric acid, glyceric acid, carboxylic oxidation products of polyglycerols, others of similar character, and hydroxyethyl and hydroxypropyl ether derivatives of the above.

Higher molecular weight carboxylic acids—straight chain and branched chain, saturated and unsaturated, carboxylic, aliphatic (including cycloaliphatic), fatty, aromatic, hydroaromatic and araliphatic acids including caproic acid, caprylic acid, pelargonic acid, capric acid, sebacic acid, oleic acid, ricinoleic acid, ricinelaidic acid, ricinostearolic acid, linoleic acid, linolenic acid, lauric acid, myristic acid, palmitic acid, mixtures of any two or more of the above-mentioned acids or other acids, mixed higher fatty acids derived from animal or vegetable sources, for example, lard, coconut oil, rapeseed oil, sesame oil, palm kernel oil, palm oil, olive oil, corn oil, cotton seed oil, sardine oil, tallow, soya bean oil, peanut oil, castor oil, seal oils, whale oil, shark oil and other fish oils, partially or completely hydrogenated animal and vegetable oils such as those mentioned; oxidized hydroxy and alpha-hydroxy higher carboxylic, aliphatic and fatty and/or polymerized higher fatty acids or higher fatty acids derived from oxidized and/or polymerized triglyceride oils; hydroxy acids such as alpha-hydroxy capric acid, alpha-hydroxy lauric acid, alpha-hydroxy myristic acid, alpha-hydroxy coconut oil mixed fatty acids, and the like; naphthenic and aromatic acids such as phthalic acid, benzoic acid, Twitchell fatty acids, naphthoic acid, pyridine carboxylic acid; hydroxy aromatic acids such as salicylic acid, hydroxy benzoic and naphthoic acids, and the like. It will be understood that mixtures of any two or more of said acids may be employed if desired and it will also be appreciated that said acids may contain substituent groups such as halogen, ketone and other groups. Of particular utility are the fatty acids containing from 8 to 18 carbon atoms.

The particularly preferred partial esters of aliphatic polyhydroxy substances for use in accordance with the present invention are the higher molecular weight fatty acid mono-esters of glycerine, glycols and polyglycols, the stearic acid mono-ester of diethylene glycol being especially satisfactory.

In place of or together with the partial esters of the aliphatic polyhydroxy substances disclosed above, we may use the higher alkyl partial ethers of the aliphatic polyhydroxy substances. Representative examples thereof are lauryl mono-ether of glycerol, myristyl mono-ether of diethylene glycol, decyl mono-ether of diglycerol, hexyl di-ether of glycerol, lauryl di-ether of diglycerol, cetyl mono-ether of glycerol, oleyl mono-ether of sorbitol, stearyl mono-ether of mannitol, and the like. Generally speaking, the partial esters are more satisfactory than the partial ethers and the use of the former is, therefore, definitely preferred.

The following examples are illustrative of compositions falling within the scope of the present invention. It will be understood, however, that the invention is not restricted thereto as various changes may be made with respect to the combinations of different modifying compounds and partial esters of aliphatic polyhydroxy substances, proportions, emollient products, and the like, all of which are within the scope of the invention in the light of the guiding principles disclosed herein.

*Example I*

(a) 90 grams of the stearic acid mono-ester of diethylene glycol and 10 grams of a modifying compound having the formula

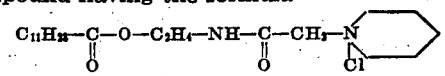

were heated together at approximately 100 degrees C. until a clear solution was obtained. The mass was then allowed to cool.

(b) A lotion was made by admixing water, mineral oil and the composition of part (a) of this example, in the following proportions by weight: 90% water, 5% mineral oil, 5% composition of part (a).

Example II (a) 80 grams of monostearin were heated to 120 degrees C. and mixed with 20 grams of a modifying compound having the formula

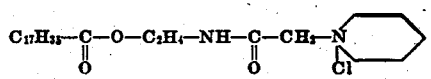

and the mass was then allowed to cool.

(b) 10 grams of the composition of part (a) of this example, 40 grams of light mineral oil and 5 grams of spermaceti were heated together to 80 degrees C. whereupon a clear oleaginous solution was formed. The same was then added slowly and with constant stirring to a solution containing 40 cc. of water and 5 grams of tartaric acid, said solution also being at 80 degrees C. The mass was continuously stirred during the addition and the stirring was continued until the resulting dispersion reached room temperature. The product comprised a heavy, white dispersion, and was very useful as a cosmetic.

Example III 35 grams of the stearic acid mono-ester of diethylene glycol and 65 grams of a modifying compound having the formula

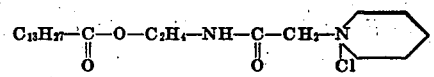

were heated and mixed together at approximately 100 degrees C. and then allowed to cool. The resulting composition may be employed to make smooth, homogeneous dispersions of aqueous or aqueous-oleaginous character containing, for example, from 2% to 15% of the composition, based on the weight of the dispersion.

Example IV 75 grams of the palmitic acid mono-ester of triethylene glycol were heated to about 100 degrees C. and mixed with 25 grams of a modifying compound having the formula

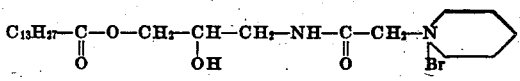

and the mass was then allowed to cool. Its properties are similar to those of the previous examples.

As has been pointed out above, and as is clear from the foregoing examples, the proportions of the modifying compounds and the partial esters of the aliphatic polyhydroxy substances are subject to considerable variation. For most purposes, it is preferred that the ratio of the modifying compounds to the partial esters of the aliphatic polyhydroxy substances be of the order of one to ten or one to from ten to twenty. However, the ratio may, in various cases, be reversed, that is, the modifying compounds may exceed the partial esters of the aliphatic polyhydroxy substances by ten fold or twenty fold. It will also be understood that the compositions may contain supplemental ingredients such as perfumes, dyes, antiseptic agents, and the like.

The proportions of the mixture of modifying compound and partial ester of aliphatic polyhydroxy substance employed in making the dispersions are subject to variation, being dependent, among other things, on the potency of the specific composition selected, the specific character of the dispersion in which it is employed, and the exact results desired. In general, from about 0.5% to 10%, based upon the weight of the dispersion, is satisfactory for most purposes but the amount may be increased substantially.

The term "higher," as used in the claims to refer to fatty acids and the like, will be understood to mean at least eight carbon atoms unless otherwise expressly stated.

What we claim as new and desire to protect by Letters Patent of the United States is:

1. An emollient composition including water and minor proportions of (1) an aliphatic polyhydroxy substance incompletely esterified with a fatty acid having from 8 to 18 carbon atoms and (2) a compound having the formula

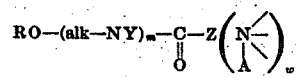

wherein R is an aliphatic radical containing at least 4 carbon atoms, alk is hydrocarbon, Y is a member selected from the group consisting of hydrogen, alkyl, cycloalkyl, alkoxyl, aralkyl, aryl and alkylol, Z is the carbon-hydrogen residue of a carboxylic acid, A is an anion, $m$ and $w$ are whole numbers, and the three valence bonds attached to nitrogen are linked directly to carbon, compound (2) exceeding the amount of compound (1) in said emollient composition.

2. An emollient composition including water and minor proportions of (1) an aliphatic polyhydroxy substance incompletely esterified with a fatty acid having from 8 to 18 carbon atoms, and (2) a compound having the formula

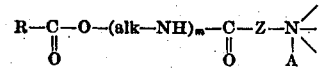

wherein R is a hydrocarbon radical containing from 5 to 17 carbon atoms, alk is a hydrocarbon radical, Z is a hydrocarbon radical, A is a halogen, $m$ is a small whole number, and the three valence bonds attached to nitrogen are linked directly to carbon, compound (2) exceeding the amount of compound (1) in said emollient composition 3. An emollient composition including water and minor proportions of (1) an aliphatic polyhydroxy substance incompletely esterified with a fatty acid having from 8 to 18 carbon atoms, and (2) a compound having the formula

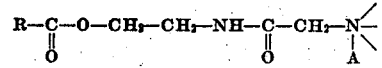

wherein R is a fatty acid hydrocarbon radical containing from 5 to 17 carbon atoms, A is halogen, and the three valence bonds attached to nitrogen are linked directly to carbon.

4. An emollient composition including water and minor proportions of (1) an aliphatic polyhydroxy substance incompletely esterified with a fatty acid having from 8 to 18 carbon atoms and (2) a compound having the formula

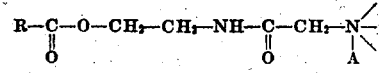

where R is a fatty acid hydrocarbon radical containing from 5 to 17 carbon atoms, A is halogen, and the three valence bonds attached to nitrogen are linked directly to carbon, compound (2) exceeding the amount of compound (1) in said emollient composition.

5. An emollient composition including water and minor proportions of (1) an aliphatic polyhydroxy substance the hydrogen of at least one but not all of the hydroxy groups of which is replaced by a higher molecular weight aliphatic radical, and (2) a compound having the formula $$R-\underset{\underset{O}{\|}}{C}-O-CH_2-CH_2-NH-\underset{\underset{O}{\|}}{C}-CH_2-\underset{\underset{Cl}{}}{N}\diagup\hspace{-0.5em}\bigcirc$$

where $$R-\underset{\underset{O}{\|}}{C}-$$

is the acyl radical of a fatty acid having from 8 to 18 carbon atoms.

6. A composition having utility in emollient compositions and the like, comprising (1) an aliphatic polyhydroxy substance the hydrogen of at least one but not all of the hydroxy groups of which is replaced by a higher molecular weight aliphatic radical, and (2) a compound having the formula $$RO-(alk-NY)_m-\underset{\underset{O}{\|}}{C}-Z\left(\underset{A}{N\diagup}\right)_w$$

wherein R is an aliphatic radical containing at least 4 carbon atoms, alk is hydrocarbon, Y is a member selected from the group consisting of hydrogen, alkyl, cycloalkyl, alkoxyl, aralkyl, aryl and alkylol, Z is the carbon-hydrogen residue of a carboxylic acid, A is an anion, $m$ and $w$ are whole numbers, and the three valence bonds attached to nitrogen are linked directly to carbon.

7. A composition having utility in emollient compositions and the like, comprising (1) an aliphatic polyhydroxy substance at least one but not all of the hydrogens of the hydroxy groups of which are replaced by a higher molecular weight aliphatic radical, and (2) a compound having the formula $$R-\underset{\underset{O}{\|}}{C}-O-(alk-NH)_m-\underset{\underset{O}{\|}}{C}-Z-\underset{A}{N\diagup}$$

wherein R is a hydrocarbon radical containing at least 7 carbon atoms, alk is a hydrocarbon radical, Z is a hydrocarbon radical, A is halogen, $m$ is a small whole number, and the three valence bonds attached to nitrogen are linked directly to carbon.

8. A composition having utility in emollient compositions and the like, comprising (1) an aliphatic polyhydroxy substance incompletely esterified with a fatty acid having from 8 to 18 carbon atoms, and (2) a compound having the formula $$R-\underset{\underset{O}{\|}}{C}-O-(alk-NH)_m-\underset{\underset{O}{\|}}{C}-Z-\underset{A}{N\diagup}$$

wherein R is a hydrocarbon radical containing from 5 to 17 carbon atoms, alk is a hydrocarbon radical, Z is a hydrocarbon radical, A is halogen, $m$ is a small whole number, and the three valence bonds attached to nitrogen are linked directly to carbon, compound (2) exceeding the amount of compound (1) in said emollient composition.

9. A composition having utility in emollient compositions and the like comprising (1) an aliphatic polyhydroxy substance incompletely esterified with a fatty acid having from 8 to 18 carbon atoms, and (2) a compound having the formula $$R-\underset{\underset{O}{\|}}{C}-O-CH_2-CH_2-NH-\underset{\underset{O}{\|}}{C}-CH_2-\underset{A}{N\diagup}$$

where R is a fatty acid hydrocarbon radical containing from 5 to 17 carbon atoms, A is halogen, and the three valence bonds attached to nitrogen are linked directly to carbon, compound (2) exceeding the amount of compound (1) in said emollient composition.

10. A composition having utility in emollient compositions and the like comprising (1) an aliphatic polyhydroxy substance the hydrogen of at least one but not all of the hydroxy groups of which is replaced by a higher molecular weight aliphatic radical, and (2) a compound having the formula $$R-\underset{\underset{O}{\|}}{C}-O-CH_2-CH_2-NH-\underset{\underset{O}{\|}}{C}-CH_2-\underset{\underset{Cl}{}}{N}\diagup\hspace{-0.5em}\bigcirc$$

where $$R-\underset{\underset{O}{\|}}{C}-$$

is the acyl radical of a fatty acid having from 8 to 18 carbon atoms.

11. A composition having utility in emollient compositions and the like comprising (1) an aliphatic polyhydroxy substance incompletely esterified with a fatty acid having from 8 to 18 carbon atoms, and (2) a compound having the formula $$R-\underset{\underset{O}{\|}}{C}-O-CH_2-CH_2-NH-\underset{\underset{O}{\|}}{C}-CH_2-\underset{\underset{Cl}{}}{N}\diagup\hspace{-0.5em}\bigcirc$$

where $$R-\underset{\underset{O}{\|}}{C}-$$

is the acyl radical of a fatty acid having from 8 to 18 carbon atoms.

12. An emollient composition including water and minor proportions of (1) an aliphatic polyhydroxy substance the hydrogen of at least one but not all of the hydroxy groups of which is replaced by a higher molecular weight aliphatic radical, and (2) a quaternary ammonium compound having the formula $$RO-(alk-NY)_m-\underset{\underset{O}{\|}}{C}-Z-\left(\underset{A}{N\diagup}\right)_w$$

wherein R is an aliphatic radical containing at least 4 carbon atoms, alk is hydrocarbon, Y is a member selected from the group consisting of hydrogen, alkyl, cycloalkyl, alkoxyl, aryl and alkylol, Z is the carbon-hydrogen residue of a carboxylic acid, A is an anion, $m$ and $w$ are whole numbers, and the three valence bonds attached to nitrogen are linked directly to carbon.

13. An emollient composition including water and minor proportions of (1) an aliphatic polyhydroxy substance the hydrogen of at least one but not all of the hydroxy groups of which is replaced by a higher molecular weight aliphatic radical, and (2) a compound having the formula $$R-\underset{\underset{O}{\|}}{C}-O-(alk-NH)_m-\underset{\underset{O}{\|}}{C}-Z-\underset{A}{N\diagup}$$

where R is a hydrocarbon radical containing at least 7 carbon atoms, alk is a hydrocarbon radical, A is halogen, $m$ is a small whole number, and the three valence bonds attached to nitrogen are linked directly to carbon.

ALBERT K. EPSTEIN.
MORRIS KATZMAN.